Sept. 14, 1943.    R. B. NAWMAN    2,329,212
METHOD OF AND APPARATUS FOR PROCESSING FRUIT
Filed July 7, 1939    5 Sheets-Sheet 1

INVENTOR.
Rollie B. Nawman
BY: Cox & Moore
ATTORNEYS.

INVENTOR.
BY: Rollie B. Nawman
Cox & Moore
ATTORNEYS.

Sept. 14, 1943.  R. B. NAWMAN  2,329,212
METHOD OF AND APPARATUS FOR PROCESSING FRUIT
Filed July 7, 1939  5 Sheets-Sheet 4

INVENTOR.
Rollie B. Nawman
BY Cox & Moore
ATTORNEYS.

UNITED STATES PATENT OFFICE 2,329,212

METHOD OF AND APPARATUS FOR PROCESSING FRUIT

Rollie B. Nawman, Oakland, Calif., assignor to Special Equipment Company, Portland, Oreg., a corporation of Oregon Application July 7, 1939, Serial No. 283,202

32 Claims. (Cl. 146—28)

This invention relates to a method of and apparatus for pitting fruit, particularly clingstone peaches and other drupaceous fruit, and more especially for pitting fruit after it has been severed into halves or into other segments.

Among the objects of the present invention are to provide a method of and apparatus for pitting halves or sections of fruit in a manner readily to extract substantially any size of pit from the fruit section without entailing the removal of portions of the flesh of the fruit and particularly when the pitting mechanism is operating on a section of fruit having a small or shallow pit; to provide a method of and apparatus for pitting sections of fruit in which provision is made for assuring the proper engagement of the flesh by the severing means at the start of the operation of severing the flesh from the pit, notwithstanding variation or irregularity in the size or form of the pit or any improper positioning of the fruit with respect to said severing means; to provide a method of and apparatus for pitting fruit sections which insures the liberation and removal of the pit without bruising or tearing the flesh of the fruit or leaving the severed surface of the fruit section rough or uneven; to provide a method of and apparatus for pitting fruit sections which avoids the use of cutting edges of the severing members in a manner requiring frequent resharpening or replacement and/or without strain on the other parts of the machine and which operation is readily adaptable either to hand or power or for manual or automatic operation; to provide a method of and apparatus for pitting fruit sections which includes the operation of shifting the pit relatively to the flesh of the peach in a manner to prevent the removal of excess flesh from the fruit section during the pitting operation; to provide an apparatus for pitting fruit sections wherein the fruit section holder during the pitting operation is adjustably shifted laterally whereby to position the pitting blade relatively to any position of the pit in the fruit section and particularly wherein variously positioned pits of successive fruit sections are to be pitted in the same machine; to provide a machine for pitting fruit sections involving mechanism permitting the pitting blade to move in a preliminary non-circular path during the pitting operation whereby to cause the blade more closely to follow the contour of the pit proper and thereby remove a minimum of flesh from the fruit during the pitting operation; to provide pitting mechanism for fruit sections wherein during the pitting operation the flesh of the peach or fruit section as a whole moves partially with the pitting mechanism and thereby prevents the pit from being too forcibly torn from the flesh of the fruit section; to provide a fruit pitting apparatus involving one or more pitting blades which are arranged to pursue a cutting path through the flesh of the pit section which is generally shallower than the normal depth of the pit while at the same time producing relative movement between the pit and the flesh of the fruit, serving to cooperate with the shallower movement of the pitting blades so as to cut a minimum of flesh from the fruit section; to provide a method of and apparatus for pitting fruit sections wherein the pitting blades are prevented from digging too deeply into the flesh of the fruit during the pitting movement and wherein the pit is in a sense lifted away from the flesh of the fruit during the pitting operation whereby to provide a shallow pitting cut; to provide a method of and apparatus for pitting fruit sections involving the application of variable pressure to the flesh of the fruit section during the pitting operation and whereby particularly to utilize a yielding pressure whereby to cause the knives closely to follow the contour of the pit as they move through the flesh of the fruit; to provide a yielding pressure upon the flesh of the fruit section during the pitting operation for the purpose intended; to provide a method of and apparatus for pitting fruit wherein one or more pitting blades are provided and are adapted to be positioned laterally of the pit of the fruit section and to one side thereof, and when two blades are provided, on opposite sides thereof in spaced relation from the pit whereby variant sized and eccentrically placed pits may be accommodated, and whereby such pitting knives are given a preliminary pit locating movement during which time the pitting knives move across the cut face of the fruit section and come into contact with the pit and thereafter follow closely the contour of the pit, cutting through the flesh of the fruit section and thereby making a shallow pitting cut; to provide a method of and apparatus for pitting fruit sections wherein two pitting knives cooperate from opposite sides of the cut face of the fruit section and wherein means is provided for automatically causing the knives adjustably to travel laterally into contact with the wall of the pit, the mechanism being constructed and arranged so that if one pitter blade contacts the pit ahead of the other, further movement of the contacting blade will be arrested until the other blade contacts the pit, whereupon both blades will simultaneously make a pitting cut about the pit and closely following the contour thereof; to provide a method of and apparatus for pitting fruit sections wherein two pitting blades are utilized and placed in spaced relation at the cut face of the half fruit on opposite sides of the pit and wherein at least one of the blades is adapted to make a pit locating, lateral movement across the cut face of the fruit section into contact with the pit, and at such contact thereafter both blades will immediately and automatically initiate the pitting movement; to provide a device for pitting fruit sections wherein the fruit section is mounted in a shiftable cup and wherein one or more pitting blades are adapted to be positioned to one side and in spaced relation to the pit at the cut face of the half fruit, including mechanism for preliminarily moving one or more of the pitter blades laterally across the cut face into contact with the pit and thereupon laterally to shift the pit relatively to the fruit flesh in which it is embedded, whereby the pit makes contact with the other blade and/or whereby the first mentioned blade will shift the peach as a whole, and the cup in which it is located, laterally so that the other side of the pit automatically contacts the opposite blade, at which time both blades will thereafter move in unison around the contour of the pit to sever the same from the flesh of the fruit section; to provide a method of and apparatus for pitting fruit sections wherein during the pit severing movement a relatively flat, plate-like member is adapted to press against the cut flesh of the fruit section concentrically about the pit while it is being severed, whereby to produce relatively opposite movements of the flesh being severed and the pit which is being severed from the flesh so as to cause a shallower cut; to provide in connection with the foregoing a yielding pressure for said flat, plate-like member and wherein the pressure increases in intensity as the pit cutters move around the contour of the pit being severed; to provide yielding and laterally mounted cup members for holding fruit sections during a pitting operation which provide for lateral as well as yielding movements of the fruit sections being severed; to provide a method and device for severing the seed sections of split fruit wherein, while the half fruit is held by a holder contacting the curved periphery of the half fruit with its seed section exposed, with severing means disposed laterally of the cut face of the half fruit and adapted arcuately to swing about a fixed axis through the flesh of the half fruit to sever the seed section thereof, the half fruit, including its holding means, is shifted away from the axis of the severing means whereby to position the seed section more closely to the path of arcuate movement of the severing means whereby to form a shallower cut in the flesh of the half fruit during the severance of the seed section; and to provide these and other objects of invention as will be apparent from a perusal of the following specification when taken in connection with the accompanying drawings, wherein:

The present invention is a continuation-in-part of my prior application Serial No. 55,030, filed December 18, 1935.

In the embodiment of the invention illustrated, the pitting mechanism is designed particularly for use with clingstone peaches which, previous to being positioned in the pitter, are severed into halves, each half having embedded therein a halved pit. However, it is to be understood that the invention is equally applicable to sections or segments of fruit having a half pit or a whole pit in a particular section.

As is well known in the art, in pitting peaches, particularly clingstone peaches, when the peaches are severed into halves it will be found that the pits are of varying size in successive peach halves, and furthermore that the pits will not be uniformly disposed or embedded in the successive peach halves so that the problem of positioning the pitting knife or knives accurately with respect to the edges of the pit at the cut face of the fruit section is a considerable one, particularly in view of the fact that when the pitting cut is made the blade or blades of the pitting mechanism must or should follow closely the contour of the pit so as to sever the minimum amount of flesh of the fruit section during the severance of the pit. Moreover it is important that during the pitting operation the knives shall not disfigure the fruit sections, shall not leave tears either in the peripheral portions of the fruit sections or in the pit cavities, and particularly shall not dig too deeply during the formation of the pit cavity. In short, the pit cavities should be formed cleanly and with the removal of the minimum amount of flesh, the aim being to provide a half peach with the pit removed and in the most saleable condition.

The drawings show one form of a single unit pitter arranged for manual or pedal operation, and in general comprising a pair of cutters arranged to enter and pass through the flesh of the fruit about the pit while the fruit is supported. In the form illustrated, the cutters are arranged to engage initially the cut face of the half fruit and are so mounted that when they initially engage such surface they are in spaced apart extended position without the confines of the pit, in a sort of initial pit locating position. Upon the operation of the cutters, or cutter, they are drawn laterally into engagement with the pit without substantially penetrating into the flesh of the fruit. This is the pit locating movement. After the pit is thus engaged, the cutters pass through the flesh of the half fruit around the pit until complete severance and liberation of the pit from the flesh is effected. Means are included in the pitter for causing a positive force to be set up during the severing operation whereby to draw or force the pit and flesh apart and to maintain the cutting members in embracing relation with the side of the pit throughout the severing operation whereby to insure the minimum severance of flesh of the fruit during the pitting operation.

Figures 1, 2:
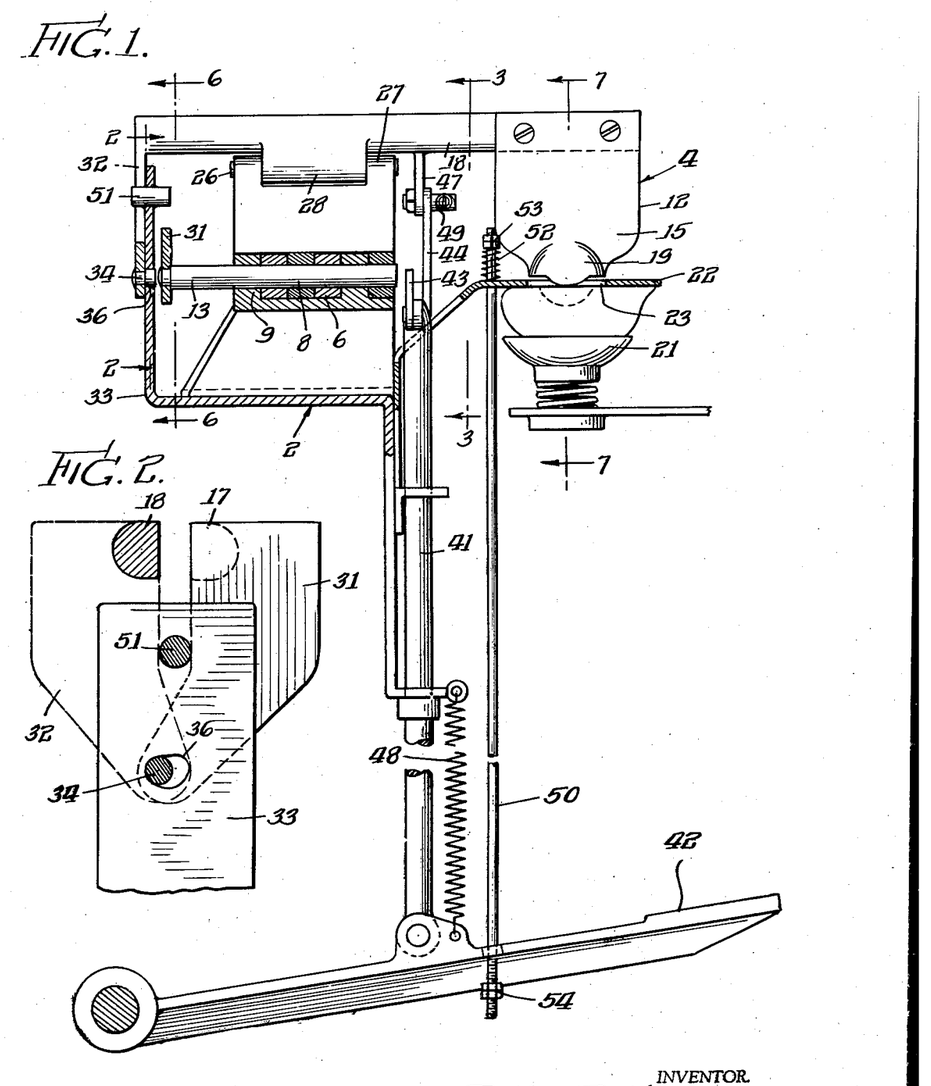
Fig. 1 is a vertical sectional view showing one form of the pitting mechanism.
Fig. 2 is a fragmentary sectional view of the device taken on the line 2—2 of Fig. 1.
Figure 7:
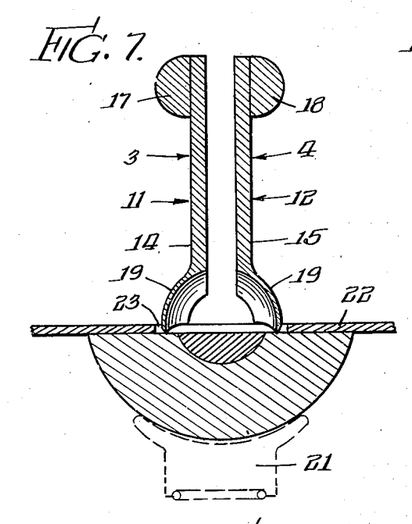
Fig. 7, Fig. 8, Fig. 9 and Fig. 10 are vertical sectional views on the line 7—7 of Fig. 1, showing the parts in the different positions in severing the fruit from the flesh of the pit.
Figure 8:
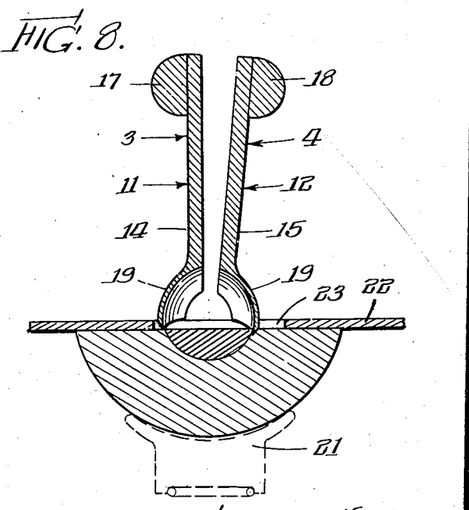
Figures 9, 10, 11:
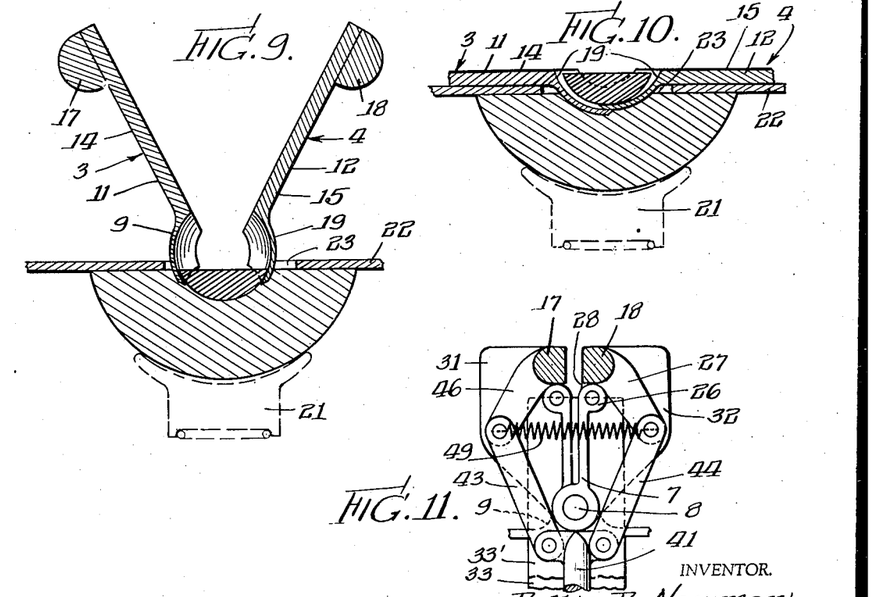
Fig. 11 is a view corresponding to the view illustrated in Fig. 3, but disclosing a somewhat modified design of pitter.

Referring specifically to the drawings, the pitting mechanism herein shown comprises a base structure 2 on which are supported a pair of pitting or cutting means 3 and 4. These cutting means include levers 6 and 7, each mounted at one end on a common shaft 8 for rotation about the axis of such shaft. The shaft 8 is fixed in bearings 9 extending from the base structure 2 and preferably disposed horizontally. These levers 6 and 7 carry the cutter blades 11 and 12, respectively, which are designed to enter and sever the flesh of the fruit around the pit in effecting the pitting operation. The pitting blades 11 and 12 are arranged for swinging about the axis of the shaft 8 and as here shown are supported opposite an end 13 of the shaft. The blades are formed as portions of preferably removable plates 14 and 15 which are connected to the levers 6 and 7 through the medium of lateral extensions or bars 17 and 18, respectively. Each blade is preferably formed as a hollow segment herein shown as a quarter sphere, and the positions and mounting of the blades are such that when the levers 6 and 7 are vertically disposed, as shown in Fig. 1, the blades more or less define a hemisphere, and the arcuate cutting edges 19 of the blades combine to form, as indicated in Fig. 7, a substantially closed curve, the outline of which approximates the surface of the pit at the severed face of the fruit, but the enclosed area of which is considerably greater than that of the pit. On the other hand, when the levers are moved through an arc of substantially ninety degrees and caused to assume the position shown in Fig. 5, the blades again more or less define a hemisphere but the cutting edge of one is substantially continuous with the cutting edge of the other, as indicated in Fig. 10. It will also be noted that in all positions of the levers or blades, the cutting edges of each of the blades define a curve which roughly is concentric to the axis of rotation of the levers.

By forming the cutting blades in the manner indicated, the arrangement is such that as they move around the contour of the pit during severance thereof from the flesh, they will form in effect a container or receiver for the pit so that in one type of operation if it be desired to move the blades upwardly, or conversely to move the flesh downwardly or to produce relative movement between the pit and the flesh in opposed directions, the blades during their severing movement and at the completion thereof will isolate or house, so to speak, the severed pit from the flesh of the fruit, so that the blades during their severing movement, will move under the pit and hold it from following movement of the flesh of the fruit where such flesh is moved away from the pit; and conversely, where the flesh of the fruit is held from movement in one direction and the blades are moved in such direction, or where the pit section or seed section is shifted relatively to a fixed path of travel of the seed severing means, the formation of the curved pitting blades will enable the pit so to be moved away from the held flesh, or, alternatively, will force the pit further away from the axis of swing of the cutting means, thereby causing the line of severance in each instance more closely to follow the contour of the pit and thereby remove the minimum of flesh during the severing cut. Furthermore, this shape of the blades contributes toward the clean ejection of the pit from the flesh of the fruit.

Means are provided for supporting the half fruit in operative relation to the blades so that upon movement of the levers from the vertical to the horizontal position as aforesaid, the blades may enter the severed face of the fruit and cut the flesh from about the pit. As is here shown, there is positioned under the blades a fruit section holder 21, preferably cupped on its upper side in conformity with the conventional curvature of the external surface of the fruit and arranged to engage and support the fruit with the severed face uppermost. The holder may be one of a series by which the pieces of fruit are advanced one at a time into operative relation to the cutters. For the purpose of this description, the holder will be considered as definitely positioned under the cutters.

As a means of insuring proper vertical positioning of the fruit and/or seed section relative to the cutter means, there is superimposed over the holder, and in spaced relation thereto, a presser member or plate 22 which is horizontally disposed and against the under side of which the severed face of the fruit section is pressed by the holder 21. Desirably the holder 21 has a spring or other resilient mounting so that the fruit supported thereby will be resiliently pressed against the backing member.

The presser member directly over the center of the holder is provided with an open portion 23 which is smaller than the area of the severed face of the fruit but is sufficiently larger than the exposed area of the half pit therein to accommodate the blades in their various positions. Preferably the normal position of the member 22 is such that when the levers 6 and 7 are vertical, the cutting edges of the blades, as shown in Fig. 7, extend through the open portion 23 and slightly into the flesh of the fruit at the severed face.

As may be understood, it is desirable that the cutting edges of the two pitter blades be held spaced apart to a considerable extent when the fruit and the cutting edges are initially placed in engagement with each other. With this initial positioning of the blades, even if the fruit be held improperly positioned against the presser member, or if the pit be not centrally disposed in the fruit, both cutter edges will invariably lie without the confines of the pit and thus the proper entry of the blade into the flesh of the half fruit will not be prevented upon the subsequent operation of the levers. It will be evident, however, that if the blades are permitted to enter and pursue the cutting operation while the blades are thus in extended relation, the segment which would be cut from the fruit would likely be considerably larger than the segment represented by the fruit and as a result a waste of fruit might readily be disproportionate to the advantage gained by the ready pitting operation.

Figures 12, 13:
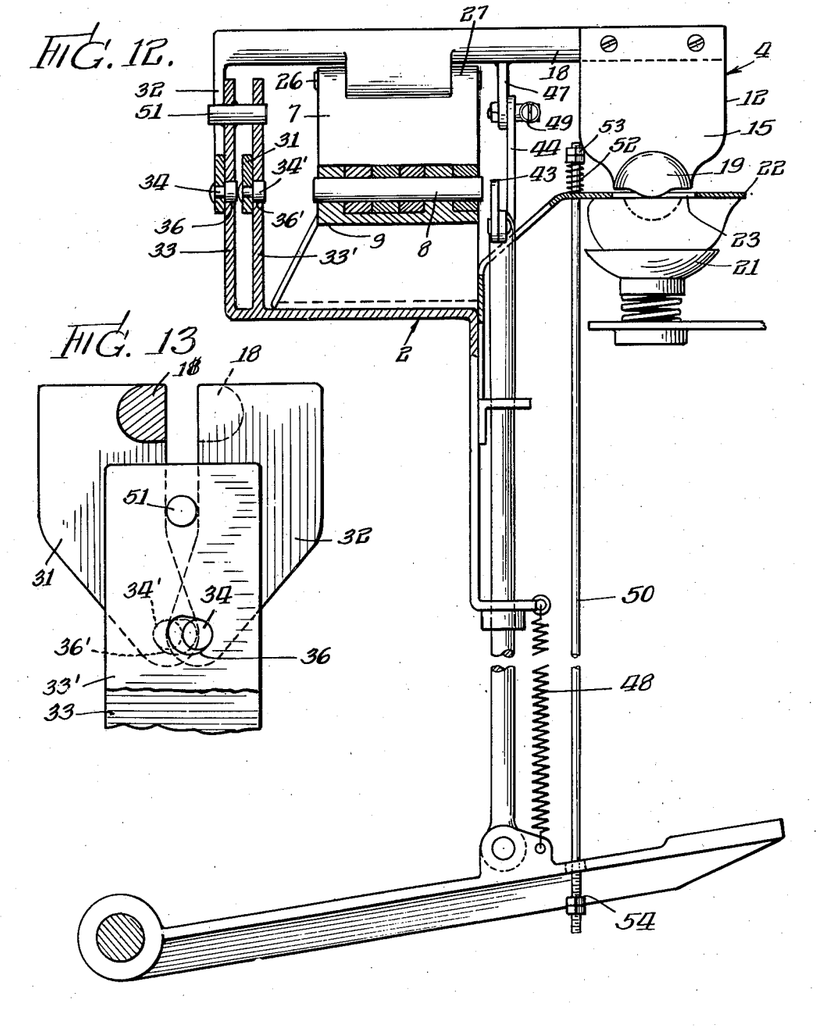
Fig. 12 is a fragmentary view corresponding to Fig. 1 but illustrating the modified structure shown in Fig. 11.
Fig. 13 is a fragmentary end view of the parts shown in Fig. 12.

In view of the foregoing, I have so designed the pitter means that penetration thereof into the flesh of the fruit will not commence at least to any substantial degree until both blades have been moved into contact with the sides of the pit. In the present embodiment of the invention, the desired inward movement of the blades, and particularly a blade, is afforded by arranging for relative movement of the blade with respect to the lever on which it is carried. If desired, such relative movement of the blade with respect to its operating lever may be provided for in connection with each cutting member, as shown in Fig. 12, or as disclosed in another embodiment as seen in Figs. 1 to 6, the relative movement of the blade and lever may be utilized in connection with but one lever and its associated blade. As will be clear from Fig. 3, the lateral extension or bar 18 by which the blade 12 is attached to the lever 7 is pivotally connected with the lever 7 instead of being rigidly connected thereto, as is the case with respect to the lateral extension or bar 17 and the lever 6. Pivotal connection of the lateral extension 18 and the lever 7 is effected by means of a pivotal pin 26 located at the free end 27 of the lever and extending through ear 28 formed on the lateral extension 18. It will be seen that the axis of the pin 26 is parallel to the axis of shaft 8 and therefore when the lateral extension 18 is rocked on the pin 26, the blade 12 will be moved directly inwardly toward the blade 11.

Extensions 17 and 18 are provided with integral arms 31 and 32, respectively, the arm 31 in this embodiment (Fig. 1) being pivotally connected directly with the shaft 8 and forming merely a reinforcement for the lever 6. In the case of the arm 32, pivotal connection is made with a stationary standard 33 associated with the stationary supporting structure 2. Connection of the arm 32 and the stationary standard is effected through a pin 34 fixed to the arm 32 and bearing in an aperture or slot 36 in the standard 33. The slot or opening 36 is horizontally elongated in order that the extension 18 may be moved relatively to the lever 7 as above explained.

Figures 3, 4, 5, 6:
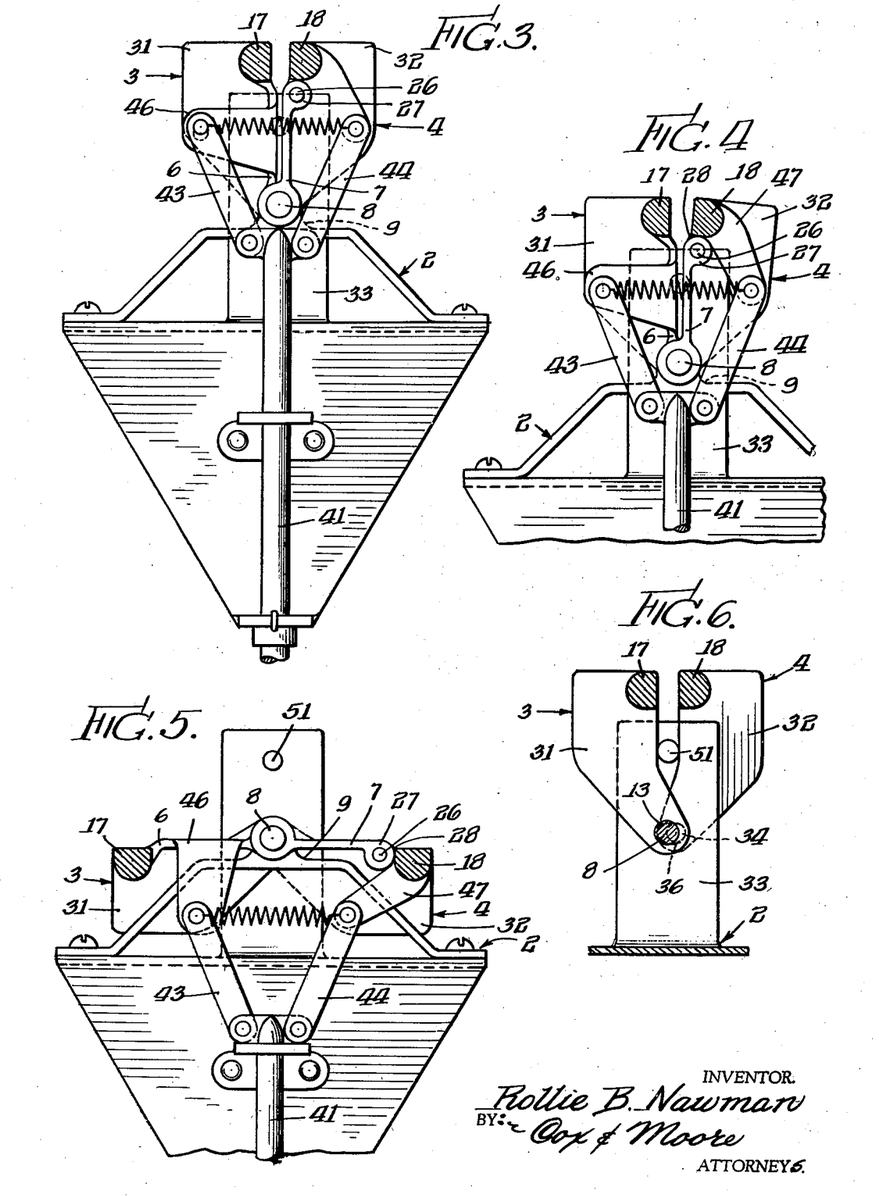
Fig. 3, Fig. 4 and Fig. 5 are vertical sectional views taken on the line 3—3 of Fig. 1, showing the pitter mechanism in different positions.
Fig. 6 is a fragmentary sectional view taken on the line 6—6 of Fig. 1, this view being in the opposite direction from that of Fig. 2.

The slot 36, as seen in Figures 2 and 6, is provided with vertical side clearance for the pin 34 to facilitate the pit locating movement of the extension 18. The pin 34 and aperture 36 are so arranged that when the lever 7 is vertically disposed, that is, when the blades are in full extended relation before initiation of the severing operation, the pin, as will be clearly seen from Figure 2, will be disposed at the rear end of the slot with the axis of the pin out of alignment with the axis of the shaft 8. But when the lever 7 is moved partially out of vertical position and the pin is thereby moved in the direction of the other end of the aperture, the axis of the pin will move into registration with the shaft axis 8. It will thus be clear that upon initial movement of the lever 7 the blade 12 will be caused to advance over the face of the fruit until contact is made with the pit and that when the contact is thus established further rotation of the lever will cause the blade with the pit as a fulcrum to swing downwardly through the flesh and around or under the pit.

It will be evident that as the lever 7 continues on its downward movement the pivoted extension 18 is caused gradually to assume the course of movement taken by the lever 7 about the shaft 8, and as a result by the time the lever 7 reaches its horizontal position the pin 34 will have reached the rear end of the slot or aperture 36 and the blade 12 will thus be guided to its final position. Since the blade 11 in this embodiment is caused at all times to move in a fixed path, the final position of the blade 11, as well as of the other blade 12, will be definite and determined. The blades preferably are so arranged that in assuming their final position under the pit the cutting edge of one blade will overlap the cutting edge of the other and thus insure a complete severance of the pit without damage to such edges. In addition, by having these blades underlie the pit no movement of the pit downwardly can possibly take place, whereas, as will be hereinafter set forth, due to the action of the pressure plate the flesh of the fruit may be forced downwardly relatively to the thus stationarily held pit whereby to produce the cutting action hereinafter set forth.

Any suitable means may be provided for effecting the rotation of the cutters and, as here shown, such means is in the form of rod 41 actuated through a pedal 42 and connected by toggle links 43 and 44 to lateral arms 46 and 47 extending from the lever 6 and the extension or bar 18, respectively. By depressing the rod when the levers 6 and 7 are in initial vertical position, the link 44 will move extension 18 downwardly about the pin 26 and in order that the blade 12 will be enabled to move inwardly toward the pit before lever 6 is caused to move downwardly about the shaft 8, the pivotal connection between the link 43 and the arm 46 is of such character as to allow a limited free movement of the link without the attendant movement of the arm. As shown best in Figure 3, this free movement is accomplished by providing a slot in the arm 46 for receiving the pivotal pin which connects the link to the arm. This provides in effect a lost motion connection. Of course, after the limit of a free movement is reached, the further downward movement of the rod causes the definite and simultaneous movement of both levers 6 and 7 until the cutting operation is completed. The downward movement of the levers is limited by the engagement of the plates 14 and 15 with the pressure member 22, as shown in Figure 10, and such downward movement of the levers is resisted by a spring 48 connected to the pedal and the base 2. This spring likewise serves to move the levers back to vertical position upon release of the pedal. A spring 49 preferably connects the upper ends of the links 43 and 44 together so as to facilitate the return and retention of the blades in proper initial position. A suitable stop 51 fixed to the stand limits the return movement of the cutter members and determines the initial position thereof. At the same time this stop assures the return of a blade 12 to extended position under the force of spring 49. The pin 34 is thereby positioned at the left end of the slot 36, as shown in Figure 2.

Figure 14:
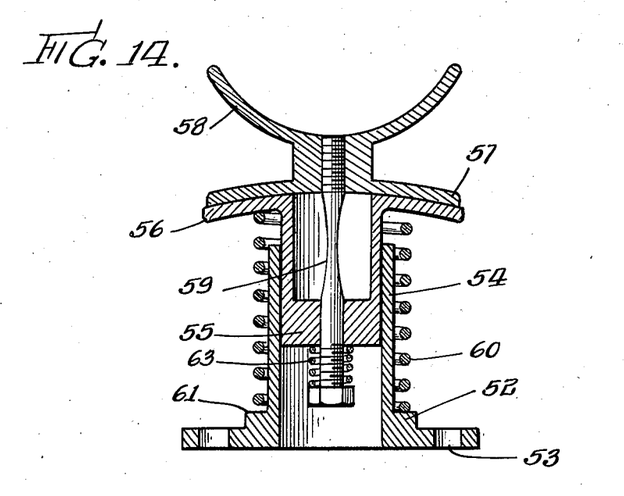
Fig. 14 is a view showing the cervical-shaped surface of the laterally shiftable cup mechanism.

It will, of course, be understood that when it is desired to cause both blades initially to move inwardly to contact the edge of the pit in advance of the movement of the blades into the flesh of the fruit, the cutter member of unit 3 may be mounted as shown in Figures 12 to 14 and similarly to the unit 4 of the first described embodiment. In such dual arrangement, the arm 31 carries a pin 34' received in an opening 36' in a standard 33', as will be clear from Figures 13 and 14 of the drawings. It will be evident that, as the blades move arcuately about the axis of the shaft 8 the contact of the blades with the pit will tend to become less pronounced and finally to cease as the blades become appreciably embedded in the flesh of the fruit during the severing operation. Means are, therefore, provided independent of the means above described for causing the blades to maintain contact with or to be maintained in close juxtaposition to the pit during the severing operation. In the present case, such added means is incorporated with the pressure member 22 and the purpose thereof is to set up a force tending, during the severing operation aforesaid, either to force the pit against the blades or to force the blades against the pit. In accomplishing the operation aforesaid by means which provides for the forcing of the pit against the blades, the pressure member is so mounted that it may be yieldingly depressed and held in such position when the blades have, as shown, for instance in Figures 9 and 10, reached a position at least partially under the pit. The resilient mounting of the member 22 is simply provided for by forming it of resilient material and having its point of attachment to the base structure at some distance from the plate portion which engages the fruit. Depression of the member 22 is effected automatically when the blades have reached the desired position under the pit, and to this end the members are connected to the pedal 42 by a rod 50, and in order that the pressure exerted by the member against the severed face of the fruit be yielding, a spring 52 is interposed between the member and a stop 53 provided on the portion of the rod extending above the member. Since the depression of the member 22 is required only after the ceasing of the contact of the blades with the pit by reason of the pivotal mounting of the blade supports as aforesaid, a limited downward movement of the rod is permitted before the rod 50 becomes actuated, such free movement of the pedal relative to the rod 50 being limited by engagement of the pedal with the stop 54 adjustably positioned on the rod. It will thus be clear that on depression of the member 22, the fruit will be gently forced downwardly and that the pit will press against the blades and as a consequence the cutting edge of the blade will pursue its way through the fruit along the sides of the pit until the severing operation has been completed. Thus, regardless of the depth, shape, or position of the pit, no waste of fruit will be entailed in severing the pit therefrom. In the foregoing operation it will be appreciated that a relative movement between the flesh of the fruit and the pit is created tending to cause the pitting blades to move closely around the contour of the pit and sever the minimum of flesh from the fruit segment.

Figure 15:
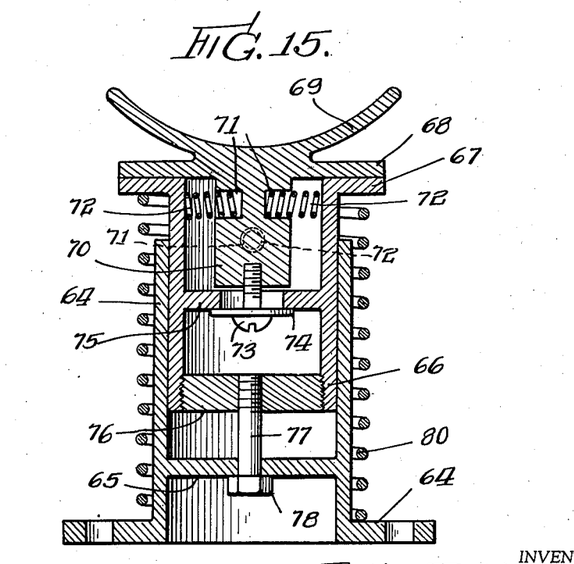
Fig. 15 is a similar view showing a modification thereof.

In lieu of the cup mechanism shown in Fig. 1 of the drawings, I may utilize the cup construction shown in Figs. 14 and 15, either with the single shiftable blade or with double shiftable blades.

Referring to Fig. 14, there is provided a stationary base 52' having means 53' whereby it will be attached to any fixed support. This base 52 includes an upstanding tubular shelf 54 within which is adapted vertically to slide the head 55 carrying at the top a convex plate 56 adapted to support a similarly formed concave plate 57 forming the base of a fruit holder 58 which latter fruit holder shown in section is preferably of cup formation and is adapted to receive and support therein the peripheral surface of a half peach or a half fruit or the peripheral surface of a fruit to be pitted or to have the central seed containing section removed therefrom. The head 55 is centrally bored to receive and hold a spring wire 59 in an upright position and allows the spring wire to slide up and down slightly. Surrounding the upright cylindrical housing 54 is a coil spring 60 which rests between a shoulder 61 thereon and the under side of the convex plate 56. Disposed between the cylinder 55 and a nut threaded on the end of a spring wire 59 is a similar and weaker coil spring 63. It will be seen that in foregoing construction, the concave and convex plates 56 and 57 serve as a sort of ball and socket joint permitting lateral movements of the cup 58 in all directions. For instance, when the cup 58 is moved laterally the spring steel wire 59 will return the cup to a center position, the vertical movement being accomplished by the cylindrical portion 55 sliding in the cylinder 54 under the influence of a spring 60. The spring 63 applies a tension downwardly on spring bar 59.

In the construction shown in Fig. 15, there is provided a cylindrical upstanding base 64 having an internal partition 65. Within the upstanding cylinder 64 is disposed a tubular head 66 having a top laterally extending circular flange 67 upon which rests a corresponding circular flange 68 of the fruit holder cup 69. This cup at its central portion is provided with a downwardly extending head 70. The head 70 has a number of holes 71 drilled part way through to receive compression springs 72 which permit the head to shift laterally in any direction on the plate-like surface 67 at the top of the cylinder. In addition, the bottom of the head is centrally bored to receive a threaded bolt 73, having a plate-like head 74 which slides over a circular inwardly extending flange 75 on the inner wall of the head 66, whereby to guide the head 70 of the fruit cup 69 in its laterally sliding movements. In addition, the internal lower portion of the cylinder 66 is threaded to receive a plug 76, in turn provided with a centrally disposed bolt having a nut 78 on its lower end engaging the lower portion of the flange 65 to provide a limited upward movement of the cylinder 66. A large coil spring 80 surrounds the tubular housing 64, the lower end of the spring pressing against the base of the housing 64 and against the under side of the plate 67 of the sliding head 66. In this type of construction likewise, the cup member 69 partakes of both vertically yielding movement and a lateral movement, automatically returning to a centralized position.

It will thus be seen that I have provided a pitting mechanism for cleanly severing the pits from half fruit or fruit sections in a manner such that the minimum of flesh can be severed. In either type of construction, that is, in a construction where both pitting blades enjoy a pit-locating movement, or in the construction where only one of the blades partakes of the pit-locating movement, irrespective of the position of the pit as it is embedded in the flesh of the fruit section, when the first blade contacts the edge of the pit in the pit-locating movement, the blade will shift the pit laterally slightly, whereby to cause it to contact with the oppositely located blade. In some instances where the single shiftable blade is utilized, the pit-locating lateral shift of the shiftable blade, in contacting the pit, will serve to move the pit laterally with respect to the flesh of the fruit section, the flesh giving or yielding a sufficient amount to permit this lateral movement of the pit. In such instance the pit, if not too far removed from the opposed stationary blade, will shift into contact with the stationary blade. Thereafter, the opposed pit sides will act as fulcra for pivotally mounted pitting plates which will thereafter automatically start downwardly on their pitting or flesh severing travel, until they meet substantially at the under side of the pit. In other instances, the single lateral shiftable pitting blade, as it contacts the side of the pit, will shift the half fruit or fruit section and the pit bodily laterally, due to the lateral movement of the cup itself, so that the opposite side of the pit will automatically be brought into engagement with the pitting blade which has no lateral pit-locating movement, and thereafter both the blades will start their pit severing movement.

In the case of construction providing a lateral pit locating movement for each of the pitting blades, when a fruit section is presented to the pitting blades which has an eccentric position with respect to the fruit section in which it is embodied, both blades will move simultaneously laterally to the pit-locating position and thereafter will move around the contour of the pit to sever the pit from the flesh.

In certain instances, the blade first to contact the pit in the pit-locating movement may additionally serve to shift the pit laterally, the opposite blade likewise moving laterally in its pit-locating movement, until both blades contact the pit on opposite sides thereof.

If any of the foregoing constructions, as the pitting blades move downwardly around the underside of the pit, the presure plate will press down upon the cut face of the fruit section, but will not contact the pit itself, and, with increasing force, will serve to move the flesh of the fruit in a direction relatively away from the pit being severed, and, as this force continues to be applied and the pitting blades continue to cut through the yet unsevered flesh of the fruit section, it will be evident that the pitting blades will be guided more closely toward the exact contour of the pit itself and thereby will sever a minimum of flesh from the fruit section.

With respect to the type of enlarged slot 36 particularly shown in Figs. 2 and 14, this slot permits the blades to more closely conform to the pit surface. In short, the slot permits the blades to move more freely and relieves the tendency of the blades to bind. In addition, it is thought that the enlarged slot will provide a cleaner cut. In connection with the slot 36 in Figs. 2 and 13, that is, where the slot 36 is larger than the diameter of the moving pin, except on each end of the slot, this allows the pitters to follow at random just after they have come in contact with the pit and until they have moved in toward the center line of the pit far enough to allow the pin 34 relatively to rest in the end of the slotted hole. From then on, until the pitting is completed, the blades travel in a true arc around the pin center. Thus, the enlarged slot 36 will make a cleaner cut in the flesh of the fruit section.

Changes may be made in the form, construction, and arrangement of the parts without departing from the spirit of the invention or sacrificing any of its attendant advantages; and the right is hereby reserved to make all such changes as fairly fall within the scope of the following claims.

I claim:

1. In a device for pitting halved fruit, a pair of movable cutters mounted to overlie the severed face of the fruit, means for moving the cutters from one position in which the cutting edges thereof are spaced apart and engage said face at opposite sides of the pit to a position in which such edges are together and within the fruit, and means for mounting said cutters whereby on initiation of the movement from said first position to the second the cutting edges will be caused to embrace the pit before substantial penetration of the edges into the fruit, and means arranged for coaction with the fruit for maintaining said cutters in embracing relation with the sides of the pit.

2. In a device for pitting drupaceous fruit, the combination of means for supporting a half fruit with its cut face exposed, a pair of cutting members having curved cutting edges conforming substantially to the curve of the pit section, means for positioning said cutting members in opposed relation at the face of the fruit on opposite sides of the pit section, with said cutting edges in contact with the flesh of the fruit in slightly spaced relation from the border line of the pit, and mechanism for operating said cutting members including means to move at least one of said cutting members substantially parallel to the cut face of the half fruit into contact with the pit section and means for thereafter arcuately swinging said cutting members to cause them to cut through the flesh of the fruit substantially along the curved outline of the pit section.

3. In a device for pitting halved fruit, as specified in claim 2, wherein means is provided for resiliently urging the cutting members into engagement with the pit of the fruit during movement of said cutting members through the flesh of the fruit along the curved outline of the pit section.

4. In a device for pitting fruit, as specified in claim 2, wherein means is provided for exerting a pressure upon the severed portion of the half fruit in a direction away from the pit section during the arcuate swinging of the cutting members through the flesh of the fruit.

5. In a device for pitting drupaceous fruit, the combination of means for supporting a half fruit with its cut face exposed, pitting means, means for mounting the pitting means to cause the same to enter the cut face of the half fruit substantially at right angles thereto and to slightly penetrate the cut face of the fruit spaced from the border line of the pit at the face of the fruit, means for shifting the pitting means to cause the same to move directly toward the pit substantially parallel to the cut face of the half fruit whereby to engage the pit walls thereby to cause said engagement to act as a fulcrum and means for thereafter swinging the pitting means arcuately through the flesh of the fruit and around the outer walls of the pit to sever the pit.

6. The method of pitting a half fruit having a pit section disposed on its cut face and unsevered therefrom, comprising supporting the half fruit with its cut face and the pit section exposed, forming superficial cuts in the cut face of the fruit on opposite sides of the pit section and spaced therefrom, extending the cuts so made through the flesh of the fruit in a direction substantially parallel to the cut face of the fruit whereby to meet the opposed outer marginal surfaces of the pit section slightly below the cut surface of the half fruit, and then extending the cuts along the under surface of the pit until they meet whereby completely to sever the pit section from the half fruit.

7. The method of pitting a half fruit having a pit section disposed on its cut face and unsevered therefrom, comprising supporting the half fruit with its cut face and the pit section exposed, forming a superficial cut in the cut face of the fruit spaced laterally from a marginal edge of the pit section, extending the cut so made through the flesh of the fruit in a direction substantially parallel with the cut face of the fruit to meet said marginal edge of the pit section, extending the cut from said marginal wall along the under surface of the pit, and exerting pressure on the fleshy portions of the fruit in a direction away from the pit during the formation of the cut around the under surface of the pit.

8. A device for pitting a half fruit having a pit section disposed on its cut face and unsevered therefrom, comprising means for supporting the half fruit with its cut face and the pit section exposed, a cutter having a cutting edge conforming to the elongated curvature of the pit, means for advancing the cutting edge substantially at right angles into the cut face of the half fruit at a distance from the margin of the pit and for then moving said cutting edge substantially parallel to the cut face of the fruit into contact with the edge of the pit slightly under the cut face of the fruit, and means for moving the cutter along the curved under surface of the pit to sever the pit.

9. In a device of the class described, means for holding a half fruit with its cut face exposed and the pit integral with the flesh thereof, means for initially positioning a pair of cutters relatively to the cut face of the half fruit so that said cutters contact the cut face of the half fruit, one on each side of and spaced from the pit, each of said cutters having a cutting edge substantially conforming to the longitudinal curvilinear wall of the half pit, and mechanism including means for moving said cutters from said initial position transversely across the face of the half fruit into contact with the half pit and means for thereafter causing said cutters to swing with the pit as a fulcrum and while in contact therewith so as to pass along the curved wall of the pit in approaching directions.

10. A device for pitting a half fruit having a pit unsevered therefrom, comprising means for supporting the half fruit with the cut face and pit exposed, pitting means, means for operating the pitting means to cut the flesh of the fruit beginning on opposite sides of the pit and continuing through the flesh of the fruit in approaching directions following closely around the curved walls of the pit until the pit is completely severed from the flesh, and means for pressing upon the flesh of the fruit on opposite sides of the pit in a direction away from the pit during such severing action.

11. The process of pitting a half fruit which comprises supporting the half fruit with its cut face and pit exposed, severing through the flesh of the fruit close to the pit, beginning on opposite sides of the pit and following around in approaching directions the under side of the pit until said lines of severance meet, and holding the pit from movement during the severing operation while exerting positive pressure on the exposed face of the flesh of the fruit in a direction away from the confined pit.

12. In a device for pitting halved fruit, means for holding a half fruit with the cut face thereof and the pit unsevered therefrom exposed, a pit removing cutter, and cutter supporting and operating mechanism including means for positioning the cutter in a position overlying the severed face of the fruit with the cutting edge engaging the said face in outwardly spaced relation to the pit, said cutter supporting and operating mechanism including means for moving the cutter from said overlying position about a first axis relatively remote from the cut face of the half fruit across the severed face of the fruit to engage the pit without substantial penetration into the flesh of the fruit and for subsequently moving said cutter about a second axis relatively close to the cut face of the half fruit to penetrate the fruit between the flesh and the pit.

13. In a pitting device, as specified in claim 12, wherein a second pit removing cutter is provided, and said cutter supporting and operating mechanism includes means for positioning the second cutter on the opposite side of the pit from the first cutter and in spaced relation to the pit, and means for moving the second cutter from said position simultaneously with the first cutter about an axis relatively remote from the cut face of the half fruit across the severed face of the fruit to engage the pit without substantial penetration into the flesh of the fruit and for subsequently moving said second cutter about the said second axis but oppositely to the direction of movement of the first cutter about said second axis.

14. In a device for pitting drupaceous fruit, the combination of means for supporting a half fruit with its cut face exposed, a pair of cutters, and cutter supporting and operating mechanism including means for causing the cutters to contact the exposed face of the fruit in outwardly spaced relation to the pit, means for thereafter moving at least one of the cutters across the cut face of the fruit while in contact with the exposed face of the fruit and into engagement with the marginal edge of the pit, means for thereafter moving both of said cutters through the flesh of the fruit about the pit to sever the pit from the fruit, and means for forcing the pit and flesh of the fruit relatively apart during the severing operation of both cutters thereby to maintain the cutters in embracing relation with the marginal wall of the pit throughout the severing operation.

15. In a pitting device, as specified in claim 14, wherein there is provided means for mounting the fruit supporting means for yielding movement in two directions, one at right angles to the other, and wherein the means for moving one of the cutters across the cut face of the fruit is constructed to move the fruit supporting means in one direction upon contacting the pit by said one cutter to position the opposite side of the pit into contact with the other of the cutters; and wherein said means for forcing the pit and the flesh of the fruit relatively apart comprises a member pressing upon the flesh of the half fruit; and wherein the fruit holding means is constructed to yield in the other direction under the force of said member pressing upon the cut face of the fruit.

16. In a pitting device, as specified in claim 14, wherein there is provided means for yieldably mounting the fruit supporting means, and the means for forcing the pit and the flesh of the fruit relatively apart comprises a plate-like member adapted to overlie the fruit while held in the fruit holder and to contact the cut face of the fruit, said plate having an aperture substantially larger than the pit so that the marginal edges of the aperture are substantially spaced from the pit, and wherein said means for moving at least one of the cutters laterally is constructed to shift the fruit supporting means laterally in a direction to bring the pit into contact with the opposite cutter.

17. In a device for pitting half fruit, the combination of means for holding a half fruit with its cut face and pit exposed, a support, pitting means comprising a shaft carried by said support and adapted to extend substantially close to the plane of the cut face of the half fruit in said holding means, a pair of levers each pivoted to swing about said shaft as an axis, a cutter extension carried on the outer end of each lever, at least one extension being pivoted to its lever and having an arm, a pin and slot connection between said arm and said support, said slot being substantially concentric with the axis of said shaft to permit a limited free movement of said arm and its associated lever extension relative to the other lever extension, a cutter rigidly carried by each of said extensions and having a curved cutting edge the axis of curvature of which passes substantially through the axis of said shaft, and means for swinging said levers and extensions about their pivots to cause said cutters to swing through the flesh of the half fruit to sever the pit from the flesh.

18. A method of pitting a half fruit which comprises supporting the half fruit with its cut face and pit exposed, severing through the flesh of the fruit close to the pit about the curved wall of the pit to sever the pit from the flesh of the fruit, and holding the pit against movement during the severing operation while applying external pressure to the flesh of the fruit in a direction away from the confined pit.

19. In a device for pitting drupaceous fruit, the combination of means for supporting a half fruit with its cut face exposed, a pair of cutting members having curved cutting edges conforming substantially to the curve of the pit section, means for positioning said cutting members in opposed relation at the face of the fruit on opposite sides of the pit section, with said cutting edges adjacent the flesh of the fruit in slightly spaced relation from the border line of the pit, and mechanism for operating said cutting members including means to move at least one of said cutting members a sufficient distance substantially parallel to the cut face of the half fruit into contact with the pit section and to shift said pit section laterally towards said opposite cutter member, and means for thereafter moving said cutting members to cause them to cut through the flesh of the fruit to sever the pit section therefrom.

20. The herein described method which comprises supporting a half fruit with its cut face and pit exposed, positioning two pitting cutters at the cut face of the half fruit and on opposite sides of and in spaced relation from the pit, shifting at least one of said pitting cutters across the cut face of the half fruit into contact with the pit section whereby to shift the pit section laterally toward the other cutter and thereafter moving both cutters through the flesh of the fruit to sever the pit therefrom.

21. In a device for pitting a half fruit, or fruit sections, a pair of movable cutters mounted to overlie the severed face of the fruit, means for moving one of said cutters from a position in which the cutting edge thereof is spaced from said pit to a position in which said cutting edge engages the pit, meanwhile holding said other cutter stationary in contact with the cut face of the fruit and spaced from the pit, said movement of said first cutter serving to move said pit laterally, and means for thereafter moving both of said cutters arcuately around the contour of the pit in approaching directions to sever the pit from the flesh of the fruit.

22. In a device of the class described, the combination of fruit holding means mounted to yield in one direction and adapted yieldingly to shift in a direction at right angles thereto, said fruit holder adapted to hold a fruit section with the pit embodied therein, a plurality of cutters, means for positioning said cutters at the cut face of the fruit section on opposite sides of the pit, and each being spaced from the side of the pit, means for moving at least one of said cutters across the cut face of the fruit section into contact with the edge of the pit whereby to shift the fruit section laterally towards the opposite cutter and the pit into contact therewith, or substantially into contact therewith, and means for thereafter arcuately moving said cutters around and in close proximity to the contour of the pit whereby to sever said pit from the flesh of the fruit section.

23. In a device for removing seed sections from previously split fruits, the combination of means for holding such a half split fruit in position for a seed severing operation, seed severing means, means for shifting the half fruit while supported by the holding means in a direction away from the severing means whereby to cause the seed section to take up a new position, and means for actuating the severing means to cause the severing means to cut through flesh of the half fruit relatively close to the margin of the seed section when in its shifted position.

24. In a peach pitting device for removing halved pits from previously split peaches, the combination of means for holding such a half split peach in position for removal of its half pit section, pitting means, means for relatively moving the pitting means and the holding means containing the split peach in a direction substantially normal to the cut face of the peach and toward each other to preliminarily position the peach relative to said pitting means, means for thereafter shifting said peach while in said holding means in an opposite direction whereby to position the pit of the peach in juxtaposition to the path of the pitting means, and means for actuating the severing means to cause it to cut through the flesh of the half fruit and relatively close to the margin of the pit while the pit is in its shifted position.

25. In a device of the class described, the combination of means for holding a half peach with its cut face and half pit exposed, pitting means adapted arcuately to move about a fixed axis during the pit severing action, means adapted to press on the half peach for moving the half peach and holding means in a direction away from said axis of movement of the pitting means, and means for causing the pitting means to swing arcuately about said axis to cut through the flesh of the half peach whereby to cause the cutting means to cut a shallower cut in the flesh of the half peach during at least a portion of the pitting operation.

26. In a pitting device for pitting a succession of peach halves which may be of variant sizes, the combination of a cup-like holder for holding a succession of half peaches which may be of variant sizes, pitting means adapted arcuately to move about a fixed axis through the flesh of each of the succession of half peaches while so held in the cup-like holder means for resiliently urging said cup toward said pitting means, means for shifting each peach while in the cup in a direction opposed to the direction in which the cup is resiliently urged, such shifting movement of each peach varying substantially in proportion to the size of the half peaches being pitted whereby to regulate the depth of successive cuts made by a cutting means through the flesh of each peach of the succession of peaches of variant sizes.

27. In a device for pitting half fruit, the combination of means forming a fruit holder adapted to hold a half fruit with its cut face and pit section exposed, cutting means of curvilinear outline conforming to the marginal outline of the pit section to be severed, means for positioning such cutting means at one side of the cut face of the half peach relative to the pit section thereof and for moving said cutting means from such position in an arcuate path in a direction to pass through the flesh of the half fruit about the border of the pit section to be cut, and means operable during such movement of the cutting means for mechanically pressing the half fruit in its cup in a receding direction relative to the arcuate path of movement of the cutting means.

28. A peach pitting device for removing half pits from previously split peaches, including a cup adapted to receive each half peach with its cut face and half pit exposed, means for resiliently urging said cup in a direction normal to the plane of the cut face of the half peach held in the cup, pitting means mounted arcuately to move through the flesh of the half peach to pit the half peach while held in the cup, means for so moving the pitting means, means adapted to contact the cut flat face of the half peach on opposite sides of and in spaced relation to the pit whereby to prevent the half peach from tilting in its cup during the pitting operation, and means adapted to shift the half peach and its cup in a direction opposed to said direction in which the cup is urged to position the periphery of the pit with respect to the arcuate path of movement of the pitting means whereby to cause the pitting means to form a shallower cut in and through the flesh of the half fruit during the pitting operation.

29. The method of pitting a half fruit having a pit disposed on its cut face and unsevered therefrom comprising supporting the half fruit with its cut face and its pit exposed, forming a superficial cut in the cut face of the fruit beginning at a point spaced from the curved wall of the pit, extending the cut so made through the flesh of the fruit in a direction substantially parallel with the cut face of the fruit to meet an outer marginal surface of the pit slightly below the cut face of the fruit, and then extending the cut along the under surface of the pit.

30. In a machine for removing the seed sections from previously halved peaches, the combination of holding means for holding a half peach with its cut face and pit section exposed, pit section severing means adapted arcuately to move along a predetermined path about an axis fixed during the pit severing movement of said severing means, means for moving the seed section in a direction toward said path, whereby to position the outer curved wall of the seed section with respect to said arcuate path of movement of the severing means, and means for actuating the severing means to cause it to cut through the flesh of the half peach relatively close to said curved wall of the seed section while the seed section is in its shifted position.

31. In a pitting device, as specified in claim 19, wherein means is provided for movably mounting said fruit supporting means, and said operating mechanism is constructed to move said fruit supporting means with the fruit contained therein upon contact of at least one of said cutting members with the pit section thereby to position the pit section relatively to the other cutting member.

32. In a device for pitting a half fruit, as specified in claim 21, wherein there is provided movably mounted means for holding a half fruit for pitting by said cutters, and wherein said means for moving one of the cutters substantially parallel to the cut face of the fruit is constructed to move the fruit holding means upon contact of the said one cutter with the pit whereby to position the opposite side of the pit in contact with the other of the said pair of cutters.

ROLLIE B. NAWMAN.

CERTIFICATE OF CORRECTION.

Patent No. 2,329,212. September 14, 1943.

ROLLIE B. NAWMAN.

It is hereby certified that error appears in the printed specification of the above numbered patent requiring correction as follows: Page 5, first column, lines 58 and 59, for "base 52" read --base 52'--; page 6, first column, line 29, for "If" read --In--; line 31, for "presure" read --pressure--; page 7, first column, line 13, claim 7, for "wall" read --edge--; page 8, second column, line 57, claim 24, for "severing" read --pitting--; page 9, first column, line 15, claim 26, for "a" before "cutting" read --the--; line 16, same claim, for "the" before "succession" read --a--; and that the said Letters Patent should be read with this correction therein that the same may conform to the record of the case in the Patent Office.

Signed and sealed this 11th day of January, A. D. 1944.

(Seal)

Henry Van Arsdale,
Acting Commissioner of Patents.